US012638365B2

(12) United States Patent
De Vries

(10) Patent No.: US 12,638,365 B2
(45) Date of Patent: May 26, 2026

(54) AIR COLLECTING DEVICE FOR A DUST MEASURING SYSTEM

(71) Applicant: ZEHNDER GROUP INTERNATIONAL AG, Gränichen (CH)

(72) Inventor: Jan De Vries, Burgum (NL)

(73) Assignee: ZEHNDER GROUP INTERNATIONAL AG, Gränichen (CH)

( * ) Notice: Subject to any disclaimer, the term of this patent is extended or adjusted under 35 U.S.C. 154(b) by 243 days.

(21) Appl. No.: 18/289,427

(22) PCT Filed: Jun. 2, 2022

(86) PCT No.: PCT/EP2022/065048
§ 371 (c)(1),
(2) Date: Nov. 3, 2023

(87) PCT Pub. No.: WO2022/268472
PCT Pub. Date: Dec. 29, 2022

(65) Prior Publication Data
US 2024/0248009 A1    Jul. 25, 2024

(30) Foreign Application Priority Data
Jun. 22, 2021    (CH) .................................... 00721/21

(51) Int. Cl.
*G01N 1/22*        (2006.01)
*G01N 15/06*       (2006.01)
(52) U.S. Cl.
CPC ....... *G01N 1/2247* (2013.01); *G01N 15/0606* (2013.01); *G01N 2001/225* (2013.01)
(58) Field of Classification Search
CPC ............. G01N 1/2247; G01N 15/0606; G01N 2001/225
See application file for complete search history.

(56) References Cited

U.S. PATENT DOCUMENTS 4,942,774 A * 7/1990 McFarland .......... G01N 1/2247
                                                    73/864.81
11,835,439 B2 * 12/2023 Tamei ................ G01N 15/0656
(Continued)

FOREIGN PATENT DOCUMENTS

WO      WO 2010/140001 A1    12/2010
WO      WO 2016/204550 A1    12/2016
WO      WO 2019/020720 A1     1/2019

OTHER PUBLICATIONS

EPO (Rijswijk, NL), English language version of the International Search Report, Form PCT/ISA/210, for International Application PCT/EP2022/065048, Oct. 21, 2022 (2 pages).
(Continued)

*Primary Examiner* — David Z Huang
(74) *Attorney, Agent, or Firm* — Pauley Erickson & Swanson

(57)        ABSTRACT

An air collecting device for a dust measuring system includes a housing defining a first chamber and a second chamber and an air inlet structure opening into the first chamber to provide an incoming air stream from the outside environment. An air outlet structure expels air from the first and/or second chamber. An adapter structure connects with a dust sensor assembly and includes a fluidic connection to the first chamber and a fluidic connection to the second chamber and a connecting portion establishing a fluidic connection between the first and second chambers. The first and second chambers are partially separated by a separator wall. The first chamber and/or the air inlet structure are configured so the incoming air stream is guided at least partially towards the adapter structure and the second chamber is configured so an air stream entering the second
(Continued)

chamber from the adapter structure passes the second chamber and is then guided into the first chamber via the connecting portion.

19 Claims, 4 Drawing Sheets

(56) References Cited

U.S. PATENT DOCUMENTS

| | | | |
|---|---|---|---|
| 2013/0036793 A1 | 2/2013 | White et al. | |
| 2013/0055801 A1* | 3/2013 | Kohno ................. | G01F 1/6842 |
| | | | 73/114.34 |
| 2017/0370315 A1 | 12/2017 | Bumberger et al. | |

OTHER PUBLICATIONS

EPO (Munich, DE), Form PCT/ISA/237, Written Opinion of the International Searching Authority for International Application PCT/EP2022/065048, Oct. 21, 2022 (10 pages).

* cited by examiner a)          b)          c)

AIR COLLECTING DEVICE FOR A DUST MEASURING SYSTEM

CROSS REFERENCE TO RELATED APPLICATION

This application is a National Phase filing in the United States, under 35 USC § 371, of PCT International Patent Application PCT/EP2022/065048, filed on 2 Jun. 2022 which claims the priority of Swiss Patent Application No. 00721/21, filed 22 Jun. 2021.

The above-referenced applications are hereby incorporated by reference herein in their entirety and are made a part hereof, including but not limited to those portions which specifically appear hereinafter.

BACKGROUND OF THE INVENTION

Field of the Invention

The present invention lies in the technical field of housing ventilation and in particular of dust detection in a room. The invention relates to an air collecting device for a dust measuring system, a dust measuring system as well as the use of dust sensor assembly with such an air collecting device.

Discussion of Related Art

A ventilation system in a building replaces used air from the inside of a building by fresh air from the outside of the building. Typically, a ventilation system comprises dust filters for filtering dust from the outside fresh air. However, even if dust filters are used, it is almost impossible to remove all the dust and in particular fine dust, from the incoming fresh air.

Instead of permanently operating a ventilation system, it may be advantageous to momentarily cease the operation of a ventilation system in order to avoid the delivery of dust to the inside of the building. At times when the overall dust load in general and/or more particularly the fine dust load exceeds a threshold value or has a peak value due to daily activities such as industrial or traffic activities, such as fine dust from tires, the ventilation system may be turned off. As a result, the delivery of fresh air ceases, however, the $CO_2$ concentration and in general the amount of used air increases. In order to determine and monitor any dust loads of the indoor air in the building, dust sensors can be used in the air ducts of the ventilation system and/or in the rooms of the building.

Noteworthy, certain indoor activities such as baking and roasting may also lead to a higher fine dust load. By measuring the fine dust concentration in the exhaust air, these high concentrations can be measured and, as a measure, the ventilation can be increased.

Measuring the fine dust concentration in the supplied outside air and in the exhaust air can lead to the fact that in one situation it is desirable to increase the ventilation and in another situation to decrease the ventilation.

SUMMARY OF THE INVENTION

Many known dust sensors require relatively slow moving air, i.e., below 2 m/s, in particular or below 1 m/s or even stagnating air to reliably operate. If such sensors are used for faster moving air, the dust values obtained depend in particular on the air velocity and are thus falsified and therefore unreliable.

It is a general object of the present invention to advance the state of the art in the field of dust detection and preferably to overcome the advantages of the prior art fully or partly. In advantageous embodiments, a more accurate and more reliable dust measurement is enabled, in particular of an air flow in a ventilation duct of a ventilation system.

According to a first aspect, the general object is achieved by an air collecting device for a dust measuring system according to the claims. The air collecting device comprises a housing which defines a first chamber and a second chamber. The air collecting device further comprises an air inlet structure opening into, preferably opening directly into, the first chamber and being configured for providing an incoming air stream from the outside environment into the first chamber. The air collecting device further comprises an air outlet structure configured for expelling air from the air collecting device, in particular from the first chamber and/or the second chamber, to the outside environment of the air collecting device. The air collecting device further comprises an adapter structure, the adapter structure being configured for being connected, in particular coupled, with a dust sensor assembly. The adapter structure comprises a fluidic connection to the first chamber and a fluidic connection to the second chamber. The adapter structure's fluidic connection to the first chamber is typically separate or different from the adapter structure's fluidic connection to the second chamber. The air collecting device further comprises a connecting portion establishing a fluidic connection between the first chamber and the second chamber. It is understood that the fluidic connection established by the connecting portion is an additional fluidic connection and therefore different from the two fluidic connections of the adapter structure. The first chamber and the second chamber are partially separated from each other by a separator wall. The first chamber and/or the air inlet structure are configured such that the incoming air stream is guided, particularly directly guided, at least partially towards the adapter structure. The second chamber is configured such that an air stream entering the second chamber from the adapter structure, i.e., via the fluidic connection of the adapter structure to the second chamber, passes the second chamber and is then guided into the first chamber via the connecting portion. The air collecting device therefore allows for a recirculating air flow, i.e., the air flow to be measured or at least a fraction thereof has to pass the adapter structure multiple times, which increases the accuracy of the results obtained by a sensor of the sensor assembly.

The separator wall is typically gas-tight. In particular, the gas permeability for oxygen at 760 Torr may be less than 10 000 cm3/m2×24 h, in particular less than 5 000 cm3/m2×24 h.

The air colleting device may typically be made from a polymer material.

In some embodiments, the first chamber and the second chamber are arranged adjacent to each other, separated by the separator wall. Such embodiments are particular compact.

In some embodiments, the air collecting device has a space demand, i.e., a volume, of 100 cm3 to 300 cm3, particularly of 100 cm3 to 200 cm3.

In some embodiments, the first chamber has a volume of 8 mL to 60 mL. In some embodiments, the second chamber has a volume of 10 mL to 65 mL.

In some embodiment, the air colleting device is configured for performing isokinetic air stream sampling. In isokinetic sampling, the velocity of the air in a ventilation tube and the velocity of the air in the air collecting device, in particular in the air inlet structure is identical. This allows to obtain a more accurate dust measurement result.

In some embodiments, the air collecting device has only a single air outlet structure, i.e., besides the adapter structure being not connected to a dust sensor assembly. Thus in certain specific embodiments, the air collecting device comprises only four fluidic pathways, i.e., air inlets and outlets, each establishing a fluidic connection with the outside environment, namely the air inlet structure, the air outlet structure and in the unconnected state, i.e., when the adapter structure is not connected to a dust sensor assembly, the adapter structure's fluidic connection to the first chamber and the adapter structure's fluidic connection to the second chamber.

In some embodiments the first chamber and/or the air inlet structure are configured such that at least 20 vol %, particularly at least 40 vol %, particularly at least 50 vol %, particularly at least 60 vol %, particularly at least 75 vol %, particularly at least 85 vol %, particularly at least 90 vol %, particularly at least 95 vol %, of the incoming air stream is guided towards the adapter structure and optionally passes the adapter structure's fluidic connection to the first chamber. It is understood that the fraction of the incoming air stream being guided towards the adapter structure does not directly exit the first chamber via the air outlet structure, but via the fluidic connection of the adapter structure to the first chamber. Optionally, the incoming air stream may then be guided into the second chamber and optionally into the connecting portion, before being expelled to the outside environment via the air outlet structure.

In some embodiments, the air inlet structure is a tubular structure having an inner diameter and/or total open area and the air inlet structure is configured such that the pressure and/or the velocity of the incoming air stream is lowered before it is provided into the first chamber. This has the advantage that isokinetic sampling can be performed and thus the accuracy of the dust measurement result is increased. In such embodiments, the air inlet structure being a tubular structure can have an angular cross-section, in particular a triangular, rectangular, square, trapezoid, pentagonal, hexagonal, heptagonal or octagonal cross section, or a rounded cross-section, in particular a circular or elliptical cross section. It is understood that the diameter refers to the maximum wall distance of the tubular structure in the cross section perpendicular to the airflow direction through the air inlet structure. The term "diameter" therefore is not restricted to circular cross sections, but to all cross-sectional shapes, in particular the cross sections mentioned above.

In some embodiments, the air inlet structure has a length of 20 mm to 100 mm, in particular between 30 mm and 80 mm.

It is understood that the tubular structure comprises a circumferential inner wall which defines an air inlet duct.

In some embodiments, the inner diameter and/or the total open area of the air inlet structure increases towards the first chamber in at least a section or continuously. Such an increase in diameter and/or total open area towards the first chamber leads to a decrease of the pressure and/or the velocity of the incoming air stream, in particular the velocity of the incoming air stream can by decreased by this down to 1 m/s or less. An increase in at least a section can for example be a single step increase of the diameter and/or total open area or a plurality of step increases of the diameter and/or total open area towards the first chamber. A continuous increase refers to a continuously increasing diameter and/or total open area, as it is for example the case in a truncated cone.

In some embodiments, the tubular structure of the air inlet structure, i.e., the air inlet duct, can have a frustoconical or frustopyramidal shape.

In some embodiments, the inner diameter of the most distal end of the air inlet structure is smaller than the inner diameter of the most proximal end of the air inlet structure, wherein the most proximal end is closer to the first chamber than the most distal end. Typically, the air inlet structure has the largest inner diameter directly at the transition into the first chamber.

In some embodiments, the total open area of the most distal end of the air inlet structure is smaller than the total open area of the most proximal end of the air inlet structure, wherein the most proximal end is closer to the first chamber than the most distal end. Typically, the air inlet structure has the largest total open area directly at the transition into the first chamber.

In some embodiments, the pressure and/or velocity decrease of the incoming air stream before it is provided into the first chamber is achieved by an additional air release opening of the air inlet structure. Such an air release opening typically opens towards the external environment and allows for removing a fraction of the incoming air stream having entered the air inlet structure at its most distal end before it enters the first chamber. For example, the air release opening may be a hole or a pressure valve. Typically, the air release opening can be positioned between the most distal end and the most proximal end of the air inlet structure.

In some embodiments, the air inlet structure and/or the air outlet structure are configured such that at least a fraction of the incoming air stream passes the fluidic connection to the first chamber of the adapter structure. A fraction can for example be at least 20 vol %, particularly at least 40 vol %, particularly at least 50 vol %, particularly at least 60 vol %, particularly at least 75 vol %, particularly at least 85 vol %, particularly at least 90 vol %, particularly at least 95 vol %, of the incoming air stream.

In some embodiments, the air outlet structure only opens directly into the first chamber and to the outside environment. Thus, in such embodiments, the second chamber is not directly connected to the air outlet structure. Any air being present in the second chamber therefore has to be expelled via the first chamber through the air outlet structure. This decreases air resistance within the air collecting device and thus enables isokinetic sampling, thereby increasing the accuracy of the dust measurement result.

In some embodiments, the air outlet structure is a channel structure extending from an opening in the separator wall to the outside environment, preferably partially or completely crossing the second chamber. The channel structure may be configured such that air entering the second chamber from the adapter structure can flow around the channel structure into the connecting portion and into the first chamber. In such embodiments, the second chamber may be defined by the housing, the separator wall and the channel structure of the air outlet structure. It is understood that the channel structure does not have an opening which opens directly into the second chamber. The channel structure is configured such that even if air crosses the second chamber it cannot flow directly from the second chamber into the channel structure.

In some embodiments, the inner diameter of the most distal end of the air inlet structure is smaller than the inner diameter of the air outlet structure, particularly at any given position of the air outlet structure. In such embodiments, air resistance within the device is reduced resulting in fine dust concentrations which enter the device in a more controlled manner, thereby allowing to perform isokinetic sampling and thus allowing for more accurate results.

In some embodiments, the total open area of the most distal end of the air inlet structure is smaller than the total open area of the air outlet structure, particularly at any given position of the air outlet structure. In such embodiments, air resistance within the device is reduced resulting in fine dust concentrations which enter the device in a more controlled manner, thereby allowing to perform isokinetic sampling and thus allowing for more accurate results.

In some embodiments, the air inlet structure and the air outlet structure are arranged oppositely with respect to each other. In such embodiments, the air inlet structure and the air outlet structure are at least partially arranged towards each other, e.g., facing each other. However, this does not mean that the air inlet structure and the air outlet structure must be arranged on the same level with respect to each other, even though, this may be the case. In some embodiments, the air inlet structure and the air outlet structure can be offset, in particular horizontally or vertically offset, to each other.

In some embodiments, the separator wall is arranged between the adapter structure and the connecting portion.

In some embodiments, the connecting portion is arranged at a first end of the housing and the adapter structure is arranged at a second end of the housing. The second end is typically diametrically opposite of the first end of the housing. This allows for an efficient recirculating airflow.

In some embodiments, the connecting portion has a U-shaped, V-shaped or arc-shaped cross-section, particularly in the cross-section through both the first chamber and the second chamber. Such cross-sections enable a smooth an efficient recirculation and redirection of the airflow when being provided from the second chamber through the connecting portion to the first chamber.

In some embodiments, the housing at least partially defines and/or comprises the connecting portion.

In some embodiments, the air collecting device further comprises a baffle structure being arranged such that the incoming air stream provided by the air inlet structure is guided, i.e., directly guided, towards the adapter structure. The baffle structure may for example be a ramp, a guiding rip, a wedge, or the like.

In some embodiments, the air outlet structure and the baffle structure are arranged such that the incoming air stream bypasses the air outlet structure, i.e., at least initially. In such embodiments, the incoming air stream cannot directly exit the first chamber via the air outlet structure, but has to pass the adapter structure, the second chamber and the connecting portion at least once, before it can be expelled via the air outlet structure. Thus, the baffle structure can be configured such that the incoming air is deflected away from the air outlet structure.

In some embodiments, the volume of the first chamber is larger than the volume of the second chamber. This further leads to a decrease of airflow velocity within the air collecting device and thus allows for isokinetic sampling and therefore enables a more accurate dust measurement.

In some embodiments, the air collecting device is injection molded, in particular in a two-step process.

In a second aspect of the invention, the general objective is achieved by the use of a dust sensor assembly with or in an air collecting device according to any of the embodiments described herein, in particular with respect to the first aspect of the invention. The dust sensor assembly comprises a dust sensor and a dust sensor chamber with a dust sensor chamber inlet and a dust sensor chamber outlet. The dust sensor chamber inlet is configured to be connected with the fluidic connection to the first chamber of the adapter structure of the air collecting device and the dust sensor chamber outlet is configured to be connected with the fluidic connection to the second chamber of the adapter structure of the air collecting device.

It is generally understood herein that the sensor is configured and arranged such that it can measure the dust content of air being present in the dust sensor chamber.

In specific embodiments, the use of such a dust sensor concerns the use to measure the dust content or concentration of an incoming air stream, in particular of an air stream of a ventilation system.

In a third aspect, the general objective is achieved by a dust measuring system comprising an air collecting device according to any of the embodiments as described herein, in particular with respect to the first aspect, and a dust sensor assembly being connected to the adapter structure of the air collecting device. The dust sensor assembly comprises a dust sensor and a dust sensor chamber. The dust sensor chamber has a dust sensor chamber inlet and a dust sensor chamber outlet. The dust sensor chamber inlet is connected to the fluidic connection to the first chamber of the adapter structure and the dust sensor chamber outlet is connected to the fluidic connection to the second chamber of the adapter structure of the air collecting device.

In some embodiments, the air collection device and the dust measuring assembly are configured such that at least a portion of the incoming airflow is recirculated multiple times before it is being expelled through the air outlet structure. A recirculation may typically comprise a flow from the first chamber to the dust sensor chamber via the adapter structure's fluidic connection to the first chamber, then from the dust sensor chamber via the adapter structure's fluidic connection to the second chamber, into the second chamber and from the second chamber via the connecting portion back into the first chamber.

In some embodiments, the air inlet structure and/or the air outlet structure are configured such that at least a fraction of the incoming air stream passes the dust sensor chamber, the second chamber and the connecting portion before being expelled through the air outlet structure. In particular embodiments, the air inlet structure and/or the air outlet structure are configured such that at least 20 vol %, particularly at least 40 vol %, particularly at least 50 vol %, particularly at least 60 vol %, particularly at least 75 vol %, particularly at least 85 vol %, particularly at least 90 vol %, particularly at least 95 vol %, of the incoming air stream passes the dust sensor chamber, the second chamber and the connecting portion before being expelled through the air outlet structure.

In some embodiments, the adapter structure and the dust sensor assembly are releasably connected with each other. The releasable connection can for example comprise a plug connection, a snap-fit mechanism, a bayonet mechanism and the like. It is understood that a releasable connection is a connection that can be released without destroying the connected components, particularly their structural integrity, and without exerting high forces.

In some embodiments, the volume of the dust sensor chamber and optionally the total volume of the dust sensor chamber, the dust sensor chamber inlet and the dust sensor chamber outlet and optionally the adapter structure's fluidic connection to the second chamber, is smaller than the volume of the first chamber. In such embodiments, the air flow velocity is further decreased, thereby allowing more accurate and reliable dust measurements.

In specific embodiments, the ratio of the volume of the first chamber to the total volume of the dust sensor chamber, the dust sensor chamber inlet and the dust sensor chamber outlet is between 2:1 and 20:1, in particular between 3:1 and 10:1.

In some embodiments, the volume of the dust sensor chamber and optionally the total volume of the dust sensor chamber, the dust sensor chamber inlet and the dust sensor chamber outlet and optionally the adapter structure's fluidic connection to the second chamber, is smaller than the volume of the second chamber. In such embodiments, the air flow velocity is further decreased, thereby allowing more accurate and reliable dust measurements.

In specific embodiments the ratio of the volume of the second chamber to the total volume of the dust sensor chamber, the dust sensor chamber inlet and the dust sensor chamber outlet is between 2:1 and 15:1, in particular between 3:1 and 8:1.

In some embodiments, the first chamber has a volume of 8 mL to 60 mL. In some embodiments, the second chamber has a volume of 10 mL to 65 mL. In some embodiments, the dust sensor chamber has a volume of 6 mL to 20 mL.

In some embodiments, the air collecting device is injection molded, in particular in a two-step process.

In a fourth aspect, the general objective is achieved by the use of a dust measuring system according to any of the embodiments described herein for measuring the dust content or the dust concentration of an incoming air stream, in particular of an air stream of a ventilation system.

In a fifth aspect, the general objective is achieved by a ventilation tube assembly comprising a ventilation tube and an air collecting device according to any of the embodiments described for the first aspect or a dust measuring system according to any of the embodiments described for the third aspect, wherein the air collecting device or the dust measuring system is connected to the ventilation tube such that the air inlet structure and optionally the air outlet structure, is arranged inside the ventilation tube. The ventilation tube may for example an exhaust air ventilation tube or a fresh air supply ventilation tube.

In a sixth aspect, the general objective is achieved by a kit of parts comprising an air collecting device according to any of the embodiments as described herein and a dust sensor assembly. The dust sensor assembly comprises a dust sensor and a dust sensor chamber with a dust sensor chamber inlet and a dust sensor chamber outlet, wherein the dust sensor chamber inlet is configured to be connected with the fluidic connection to the first chamber of the adapter structure of the air collecting device and wherein the dust sensor chamber outlet is configured to be connected with the fluidic connection to the second chamber of the adapter structure of the air collecting device.

BRIEF DESCRIPTION OF SEVERAL VIEWS OF THE DRAWINGS

The herein described invention will be more fully understood from the detailed description given herein below and the accompanying drawings of specific embodiments which should not be considered limiting to the invention described in the appended claims. The drawings are showing:

DETAILED DESCRIPTION OF THE INVENTION

Figure 1:
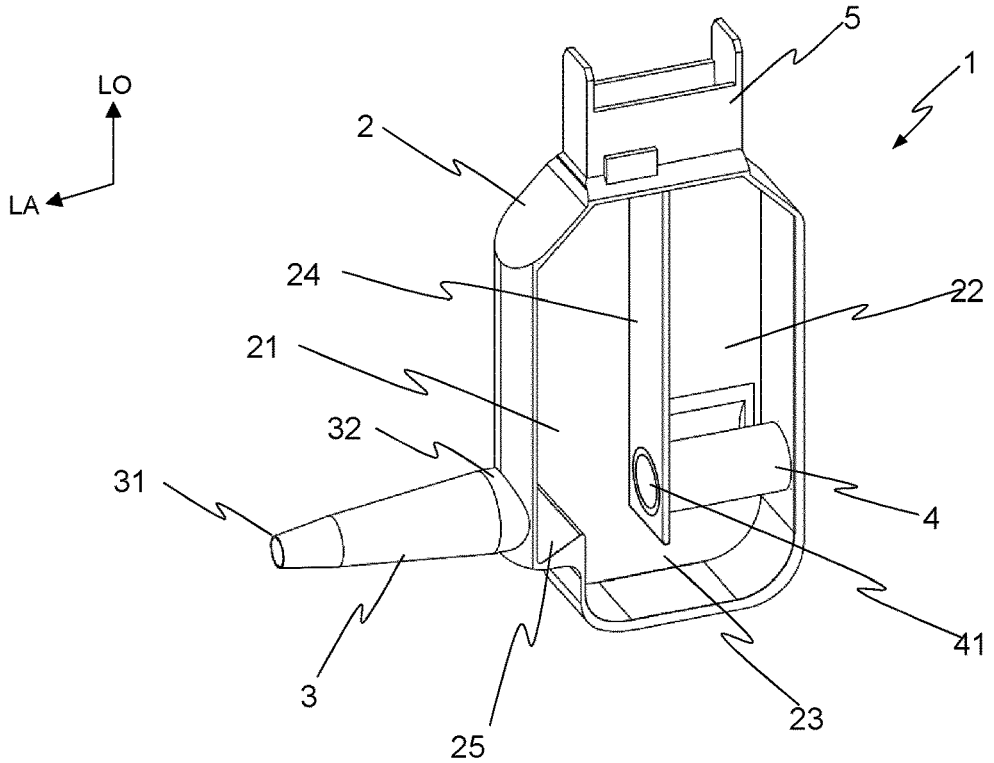
FIG. 1 shows an air collecting device according to an embodiment of the invention in which the front side of the housing is removed.

FIG. 1 discloses an air collection device 1 wherein the front side of the housing 2 has been removed. Housing 2 defines first chamber 21 and second chamber 22 being arranged adjacent to one another and being partially separated by separator wall 24. Air collecting device 1 further comprises air inlet structure 3 with most distal end 31 and most proximal end 32. Air inlet structure 3 in general may in this or in any other embodiment described herein define an opening which directly opens into first chamber 21. Furthermore, air collecting device 1 comprises air outlet structure 4. An incoming air stream can enter first chamber 21 via air inlet structure 3 and can be expelled from the air collecting device via air outlet structure 4 to the outside environment. In addition, air collecting device 1 comprises adapter structure 5 which is configured for being connected to a dust sensor assembly (not shown here, see FIGS. 3 and 4). Adapter structure 5 includes a fluidic connection to first chamber 21 and additionally another fluidic connection to second chamber 22. Furthermore, air collecting device 1 comprises connecting portion 23 establishing a fluidic connection, particular a direct fluidic connection, between first chamber 21 and second chamber 22. As can be seen, the fluidic connection established by connecting portion 23 is different and/or separated from the fluidic connections established by adapter structure 5. First chamber 21 and/or inlet structure 3 are configured such that an incoming air entering the first chamber via air inlet structure 3 is guided at least partially towards adapter structure 5. Second chamber 22 is further configured such that an air stream entering the second chamber from the adapter structure 5, i.e., from the adapter portion's fluidic connection to the second chamber, passes the second chamber and is then guided into first chamber 21 via connecting portion 23.

In the embodiment shown in FIG. 1, and the following can optionally also apply to any other embodiment described herein, first chamber 21 is defined by housing 2, separator wall 24 and connecting portion 23. Furthermore, first chamber 21 is positioned between adapter structure 5 and connecting portion 23. Similarly, second chamber 22 is defined by housing 2, separator wall 24 and connecting portion 23 and is also positioned between adapter structure 5 and connecting portion 23. Connecting portion 23 extends from second end of housing 2 being diametrically opposite to the above mentioned first end of housing 2 where the adapter structure is located, in the longitudinal direction (LO), i.e., towards separator wall 23, up to the separator wall 23. In the lateral direction (LA), i.e., the direction being perpendicular to the longitudinal direction and extending towards air inlet structure 3, connecting portion 23 is defined by housing 2.

Air inlet structure 3 and/or air outlet structure 4 can be configured such that at least a fraction of the incoming air stream passes the adapter structure's fluidic connection to the first chamber. In the embodiment shown in FIG. 1, this is for example achieved by positioning the air outlet structure such that at least the fraction of the incoming air stream cannot directly exit the first chamber. As can be seen, opening 41 of outlet structure 4 is leveled such that it lies outside the reach of the incoming air flow path. Air outlet structure 3 opens in the embodiment shown directly into first chamber 21. Furthermore, air outlet structure 4 is channel structure, in this case a tube with a circular cross section, extending from opening 41 in separator wall 24 to the outside environment, thereby completely crossing second chamber 22. Any airflow flowing from the second chamber towards the first chamber via connecting portion 23 can flow around the channel structure of air outlet structure 4. As can be seen, air outlet structure 4 extends such that it essentially perpendicular to the direction of airflow from adapter structure 5 through second chamber 22.

Connecting portion 23 is in this embodiment, and can also in any other embodiment described herein be, positioned adjacent first chamber 21 and the second chamber 22. In the embodiment shown in FIG. 1, the connecting portion has a U-shaped cross-section, which makes redirection of airflow more efficient and causes less turbulences. Connecting portion 23 is arranged at a first end of housing 2 and adapter structure 5 is arranged at a second end of the housing 2. Second end of housing 2 is diametrically opposite of the first end of housing 2.

The air collecting device shown in FIG. 1 further comprises baffle structure 25 which is arranged such that the incoming air stream provided by air inlet structure 3 is guided towards, e.g., directly guided towards, adapter structure 5.

Figure 2:
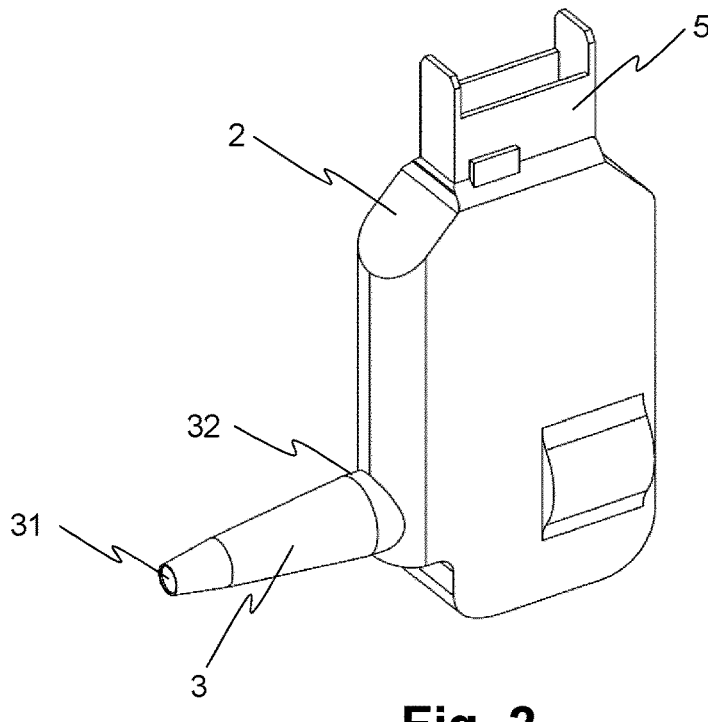
FIG. 2 shows the air collecting device of FIG. 1 with the front side of the housing being attached.

FIG. 2 shows the air collecting device 1 of FIG. 1 with the front side of housing 2 being attached.

Figure 3:
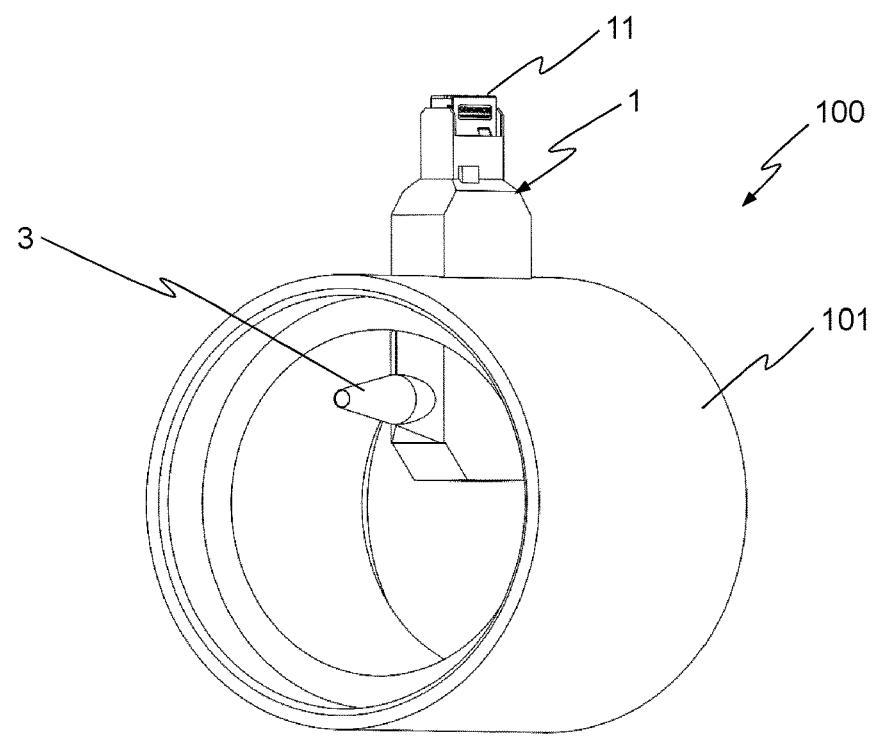
FIG. 3 shows a ventilation tube assembly according to an embodiment of the invention.

FIG. 3 shows ventilation tube assembly 100 with ventilation tube 101 and a dust measuring system including air collecting device 1 and dust sensor assembly 11. As can be seen, air inlet structure 3 is arranged inside ventilation tube 101 such that the dust concentration and/or content of an air stream inside ventilation tube 101 can be measured.

Figure 4:
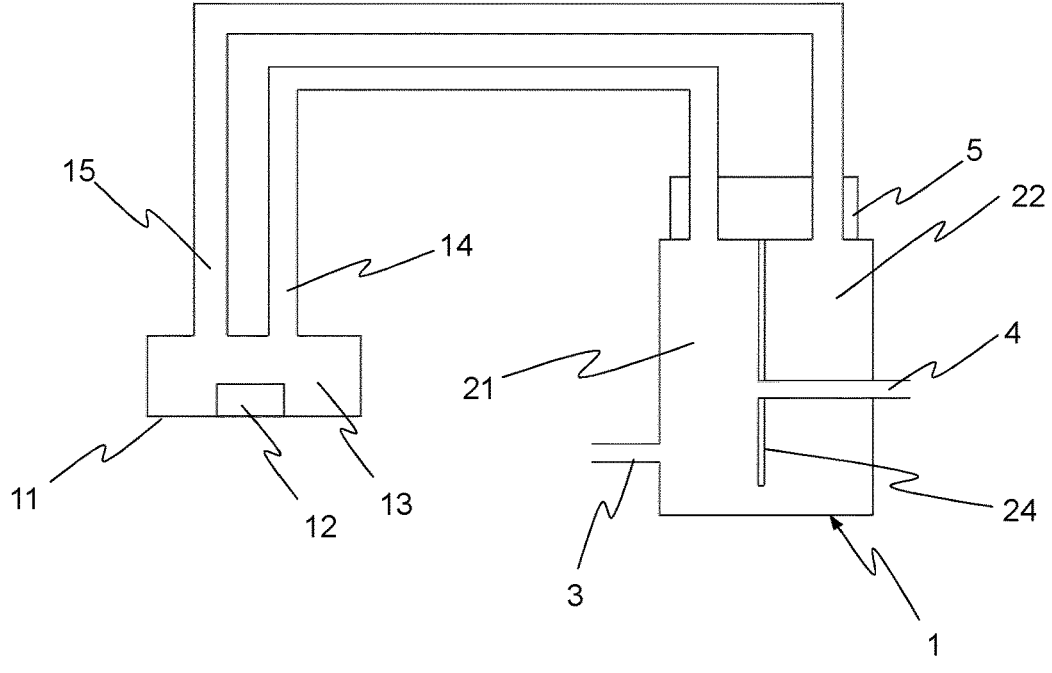
FIG. 4 shows a schematic representation of a dust measuring system according to an embodiment of the invention.

FIG. 4 shows schematically dust measuring system 10 with air collecting device 1. Air collecting device 1 may for example be the same as the device described for FIG. 1 and thus the references and features described above may also apply for the embodiment shown in FIG. 4. Dust sensor assembly 11 is connected to adapter structure 5 of air collecting device 1. Dust sensor assembly 11 comprises dust sensor 12 and dust sensor chamber 13. Dust sensor assembly 11 further comprises a dust sensor chamber inlet 14 and dust sensor chamber outlet 15. Dust sensor chamber inlet 14 is connected to the adapter structure's fluidic connection to the first chamber 21 and dust sensor chamber outlet 15 is connected to the adapter structure's fluidic connection to the second chamber 22. As can be seen, the air collecting device 1 according to the invention allows for a recirculation of the incoming airflow. In operation, the incoming airflow typically conducts multiple circles before it is expelled from the air collecting device, thereby increasing the accuracy of the dust measurement.

Figure 5:
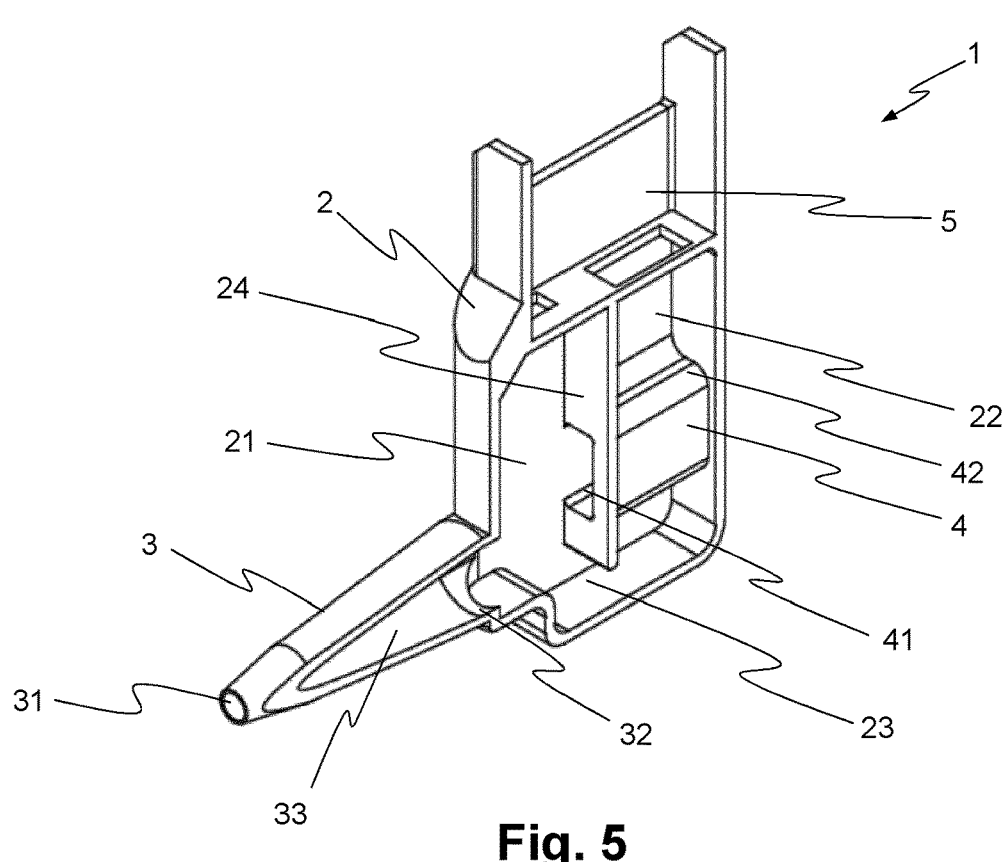
FIG. 5 shows a perspective sectional view of an air collecting device according to another embodiment of the invention.

FIG. 5 shows a sectional view of air collecting device 1 according to another embodiment of the invention. It is noted that the same reference signs as in FIG. 1 correspond to the same features and thus the statements above also apply for the embodiment shown in FIG. 5 unless stated otherwise. In the sectional view, it can be seen that the inner diameter, respectively the total open area, of air inlet structure 3 continuously increases towards first chamber 21. The inner diameter, respectively the total open area, of the most distal end 31 of air inlet structure 3 is smaller than the diameter, respectively the total open area, of the most proximal end 32 of air inlet structure 3. In contrast to the embodiment shown in FIG. 1, the embodiment shown in FIG. 5 has an outlet structure 4 with an essentially rectangular cross section. Outlet structure 4 crosses second chamber 22 completely in the lateral direction such that any air flow entering the second chamber through the adapter structure's fluidic connection and passes second chamber 22 to flow into connecting portion 23 and into first chamber 21, crosses air outlet structure 4 essentially perpendicularly. Flank 42 facing adapter structure 5 can in this embodiment or in any other embodiment of the air collecting device described herein, have an arc shape, in particular a concave shape, i.e., when seen from the adapter structure 5. This avoids turbulences and noises and enables smooth airflow.

Figure 6:
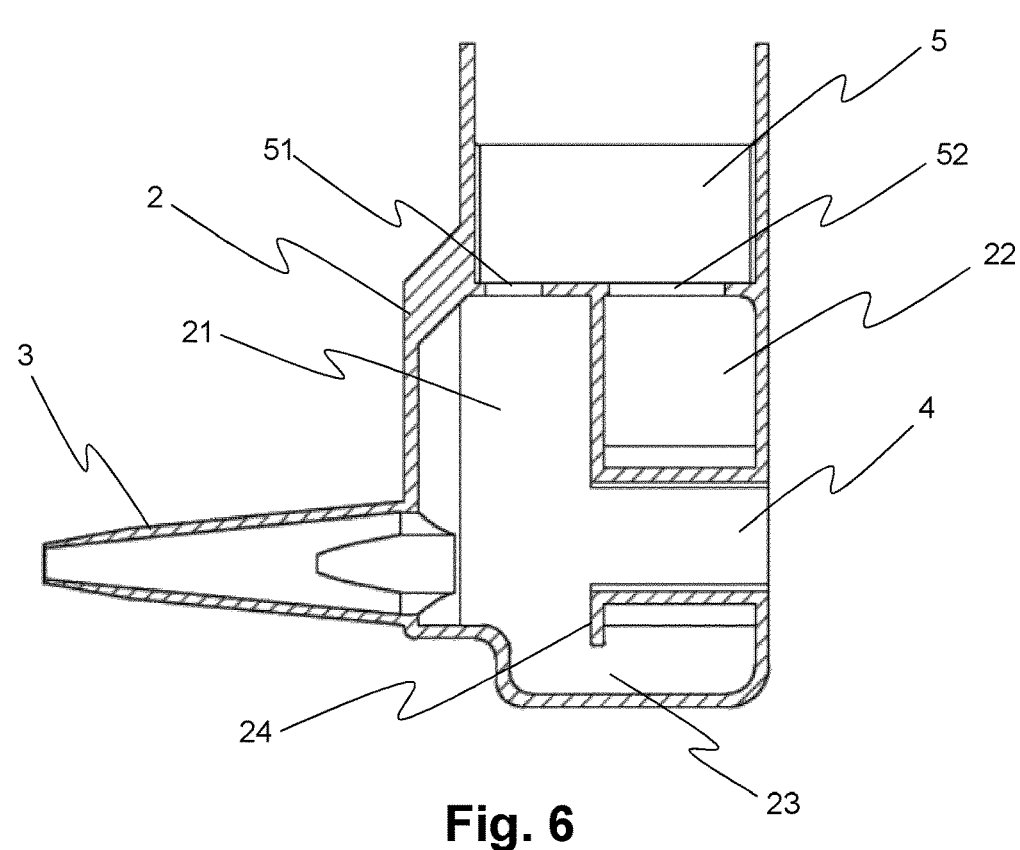
FIG. 6 shows a cross-sectional view of the air collecting device of FIG. 5.

FIG. 6 shows a cross-sectional view of the air collecting device 1 of FIG. 5. It is noted that the same reference signs as in FIG. 5 correspond to the same features and thus the statements above also apply for the embodiment shown in FIG. 6. It can be seen that adapter structure 5 comprises fluidic connection 51 to first chamber 21 and fluidic connection 52 to second chamber 22. Fluidic connection 51 and fluidic connection 52 are separated, respectively different, from each other. Furthermore, it can be seen that the tubular structure of air inlet structure 3, i.e., the air inlet duct formed by its circumferential inner wall, has a frustoconical shape.

Figure 7:
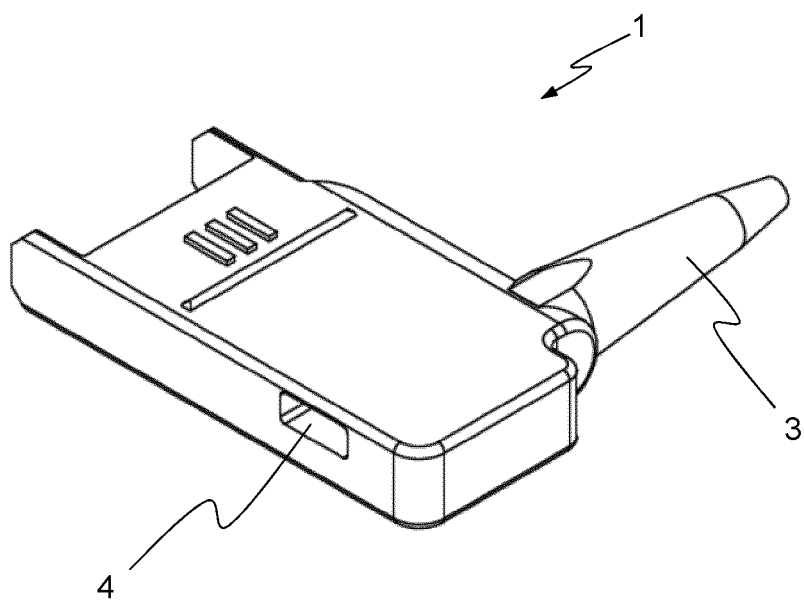
FIG. 7 shows a perspective view of the air collecting device of FIG. 5 and FIG. 6.

FIG. 7 shows a perspective view of the air collecting device shown in FIG. 5 and FIG. 6. As can be seen, the air outlet structure 4 opens towards the outside environment of the air collecting device 1 on the diametrically opposite side of the air inlet structure 3.

Figure 8:
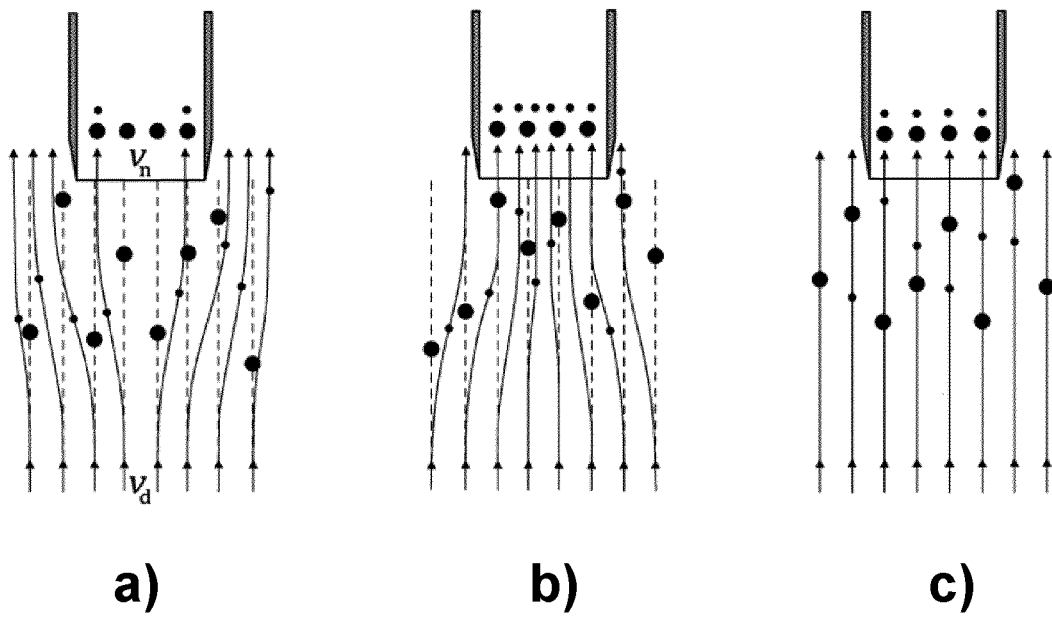
FIG. 8a shows the principle of isokinetic sampling.
FIG. 8b shows the principle of isokinetic sampling.
FIG. 8c shows the principle of isokinetic sampling.

The principle of isokinetic sampling is illustrated in FIG. 8. FIG. 8 *a*) and b) show non-isokinetic sampling scenarios. In FIG. 8 *a*) the air stream velocity vd in the ventilation tube is higher than the air stream velocity vn within the air inlet duct. Because of the kinetic energy of the fine dust, the fine dust particles do not diverge to the same extend than the air molecules and thus still enter the measuring device. Because of this, more fine dust enters the device which leads to the detection of a higher dust concentration as it is actually present in the air stream within the ventilation tube and thus to in an incorrect measurement. FIG. 8 *b*) shows the reverse scenario in which the air stream velocity vd in the ventilation tube is lower than the air stream velocity vn within the air inlet duct. This causes more air to diverge into the measuring device. Fine dust particles however do not diverge to the same extend due to the kinetic energy and therefore a lower number of dust particles enters the air collecting device. Because of this, more air is entering the device compared to the fine dust which leads to the detection of a lower dust concentration as it is actually present in the air stream within the ventilation tube and thus results in an incorrect measurement. FIG. 8 *c*) shows isokinetic sampling, i.e., the ideal scenario in which the air stream velocity vd in the ventilation tube is equal to the air stream velocity vn within the air inlet duct. Isokinetic sampling ensures that the dust concentration of the air stream within the air collecting device, which is actually measured by a dust sensor, corresponds to the actual dust concentration in the ventilation tube. As mentioned herein, isokinetic sampling can be enabled by controlling the air stream velocity within the air inlet structure, by the air stream velocity within the air collecting device, and/or by decreasing air flow resistance within the air collecting device.

The invention claimed is:

1. An air collecting device (1) for a dust measuring system, the air collecting device (1) comprising:
   a housing (2) defining a first chamber (21) and a second chamber (22);
   an air inlet structure (3) opening into the first chamber (21) and configured for providing an incoming air stream from an outside environment into the first chamber (21);
   an air outlet structure (4) configured for expelling air from the air collecting device;
   an adapter structure (5), the adapter structure (5) configured for being connected with a dust sensor assembly, wherein the adapter structure (5) comprises a fluidic connection to the first chamber (21) and a fluidic connection to the second chamber (22);
   a connecting portion (23) establishing a fluidic connection between the first chamber (21) and the second chamber (22);
   wherein the first chamber (21) and the second chamber (22) are partially separated by a separator wall (24), wherein the air outlet structure (4) is a channel structure extending from an opening (41) in the separator wall (24) to the outside environment; and wherein
   the first chamber (21) and/or the air inlet structure (3) are configured such that the incoming air stream is guided at least partially towards the adapter structure (5) and wherein the second chamber (22) is configured such that an air stream entering the second chamber (22) from the adapter structure (5) passes the second chamber (22) and is then guided into the first chamber (21) via the connecting portion (23).

2. The air collecting device (1) according to claim 1, wherein the air inlet structure (3) comprises a tubular structure having an inner diameter and/or a total open area, and wherein the air inlet structure (3) is configured such that the pressure and/or the velocity of the incoming air stream is lowered before it is provided into the first chamber (21).

3. The air collecting device (1) according to claim 2, wherein the inner diameter and/or the total open area of the air inlet structure (3) increases towards the first chamber (21) in at least a section or continuously.

4. The air collecting device (1) according to claim 3, wherein the inner diameter and/or the total open area of the most distal end (31) of the air inlet structure (3) is smaller than the inner diameter and/or total open area of the most proximal end (32) of the air inlet structure (3), wherein the most proximal end (32) is closer to the first chamber (21) than the most distal end (31).

5. The air collecting device (1) according to claim 1, wherein the air inlet structure (3) and/or the air outlet structure (4) are configured such that at least a fraction of the incoming air stream passes the fluidic connection of the adapter structure (5) to the first chamber (21).

6. The air collecting device (1) according to claim 1, wherein the air outlet structure (4) only opens directly into the first chamber (21) and to the outside environment.

7. The air collecting device (1) according to claim 1, wherein the air outlet structure (4) crosses the second chamber (22).

8. The air collecting device (1) according to claim 1, wherein the air inlet structure (3) and the air outlet structure (4) are arranged oppositely with respect to each other.

9. The air collecting device (1) according to claim 1, wherein the separator wall (24) is arranged between the adapter structure (5) and the connecting portion (23).

10. The air collecting device (1) according to claim 1, wherein the connecting portion (23) is arranged at a first end of the housing (2) and wherein the adapter structure (5) is arranged at a second end of the housing (2), wherein the second end of the housing (2) is diametrically opposite of the first end of the housing (2).

11. The air collecting device (1) according to claim 1, further comprising a baffle structure (25) arranged such that the incoming air stream provided by the air inlet structure (3) is guided towards the adapter structure (5).

12. The air collecting device (1) according to claim 11, wherein the air outlet structure (4) and the baffle structure (25) are arranged such that the incoming air stream bypasses the air outlet structure (41).

13. A method of use of a dust sensor assembly (11) with or in an air collecting device (1) according to claim 1, the dust sensor assembly (11) comprising a dust sensor (12) and a dust sensor chamber (13) with a dust sensor chamber inlet (14) and a dust sensor chamber outlet (15), the method comprising:
   connecting the dust sensor chamber inlet (14) with the fluidic connection to the first chamber (21) of the adapter structure (5) of the air collecting device (1); and
   connecting the dust sensor chamber outlet (15) with the fluidic connection to the second chamber (22) of the adapter structure (5) of the air collecting device (1).

14. A dust measuring system (10) comprising an air collecting device (1) according to claim 1 and a dust sensor assembly (11) connected to the adapter structure (5) of the air collecting device (1), wherein the dust sensor assembly (11) comprises a dust sensor (12) and a dust sensor chamber (13) with a dust sensor chamber inlet (14) and a dust sensor chamber outlet (15), wherein the dust sensor chamber inlet (14) is connected to the fluidic connection to the first chamber (21) of the adapter structure (5) and wherein the dust sensor chamber outlet (15) is connected to the fluidic connection to the second chamber (22) of the adapter structure (5) of the air collecting device (1).

15. The dust measuring system (10) according to claim 14, wherein the air inlet structure (3) and/or the air outlet structure (4) are configured such that at least a fraction of the incoming air stream passes the dust sensor chamber (13), the second chamber (22) and the connecting portion (23) before being expelled through the air outlet structure (4).

16. The dust measuring system (10) according to claim 14, wherein the volume of the dust sensor chamber (13) and/or the total volume of the dust sensor chamber (13), the dust sensor chamber inlet (14) and the dust sensor chamber outlet (15) is smaller than the volume of the first chamber (21) and/or the volume of the second chamber (22).

17. A ventilation tube assembly (100) comprising a ventilation tube (101) and an air collecting device (1) according to claim 1, wherein the air collecting device (1) or the dust measuring system (10) is connected to the ventilation tube (101) such that the air inlet structure (3) is arranged inside the ventilation tube (101).

18. A kit of parts comprising an air collecting device (1) according to claim 1 and a dust sensor assembly (11), the dust sensor assembly (11) comprising a dust sensor (12) and a dust sensor chamber (13) with a dust sensor chamber inlet (14) and a dust sensor chamber outlet (15), wherein the dust sensor chamber inlet (14) is configured to be connected with the fluidic connection to the first chamber (21) of the adapter structure (5) of the air collecting device (1) and wherein the dust sensor chamber outlet (15) is configured to be connected with the fluidic connection to the second chamber (22) of the adapter structure (5) of the air collecting device (1).

19. The ventilation tube assembly (100) according to claim 17, wherein the air collecting device (1) or the dust measuring system (100) is connected to the ventilation tube (101) such that the air outlet structure (4) is arranged inside the ventilation tube (101).

\* \* \* \* \*